(12) United States Patent
Alsina et al.

(10) Patent No.: US 11,880,808 B2
(45) Date of Patent: Jan. 23, 2024

(54) SECURING IN-APP PURCHASES

(71) Applicant: Apple Inc., Cupertino, CA (US)

(72) Inventors: Thomas Matthieu Alsina, Paris (FR);
Scott T. Boyd, Montara, CA (US);
Michael Kuohao Chu, Cupertino, CA (US); Augustin J. Farrugia, Los Altos Hills, CA (US); Gianpaolo Fasoli, Redwood City, CA (US); Patrice O. Gautier, San Francisco, CA (US); Sean B. Kelly, Cupertino, CA (US); Payam Mirrashidi, Los Altos, CA (US); Pedraum Pardehpoosh, Palo Alto, CA (US); Conrad Sauerwald, Mountain View, CA (US); Kenneth W. Scott, San Jose, CA (US); Rajit Shinh, San Francisco, CA (US); Braden Jacob Thomas, San Jose, CA (US); Andrew R. Whalley, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 848 days.

(21) Appl. No.: 16/659,078

(22) Filed: Oct. 21, 2019

(65) Prior Publication Data

US 2020/0047865 A1 Feb. 13, 2020

Related U.S. Application Data

(62) Division of application No. 13/668,109, filed on Nov. 2, 2012, now Pat. No. 10,586,260.
(Continued)

(51) Int. Cl.
*G06Q 20/00* (2012.01)
*B63H 20/02* (2006.01)
*B63H 20/06* (2006.01)

(52) U.S. Cl.
CPC ............. *G06Q 20/00* (2013.01); *B63H 20/02* (2013.01); *B63H 20/06* (2013.01)

(58) Field of Classification Search
CPC ....................................................... G06Q 20/00
(Continued)

(56) References Cited

U.S. PATENT DOCUMENTS

| 6,226,618 B1 | 5/2001 | Downs et al. |
| 6,772,340 B1 | 8/2004 | Peinado et al. |

(Continued)

FOREIGN PATENT DOCUMENTS

WO 0148658 A1 7/2001

OTHER PUBLICATIONS

Karen Haslam, "Apple will fix App Store vulnerability with iOS 6", Jul. 23, 2012, download date: Jul. 30, 2012, http://news.idg.no/cw/art.cfm?id=01BD56D5-050A-2A70-BB8767EA6E6B8377, pp. 1-3, Macworld U.K.

(Continued)

*Primary Examiner* — Courtney P Jones
(74) *Attorney, Agent, or Firm* — Womble Bond Dickinson (US) LLP

(57) ABSTRACT

In one embodiment, a unique (or quasi unique) identifier can be received by an application store, or other on-line store, and the store can create a signed receipt that includes data desired from the unique identifier. This signed receipt is then transmitted to a device that is running the application obtained from the on-line store and the device can verify the receipt by deriving the unique (or quasi-unique) identifier from the signed receipt and comparing the derived identifier with the device identifier stored on the device, or the vendor identifier assigned to the application vendor.

12 Claims, 11 Drawing Sheets

Related U.S. Application Data

(60) Provisional application No. 61/673,413, filed on Jul. 19, 2012.

(58) Field of Classification Search
USPC .......................................................... 705/67
See application file for complete search history.

(56) References Cited

U.S. PATENT DOCUMENTS

| | | | |
|---|---|---|---|
| 8,275,672 | B1 | 9/2012 | Nguyen et al. |
| 10,817,919 | B1* | 10/2020 | Chud ...................... H04L 67/02 |
| 2006/0116966 | A1 | 6/2006 | Pedersen et al. |
| 2006/0131385 | A1 | 6/2006 | Kim |
| 2007/0260738 | A1 | 11/2007 | Palekar et al. |
| 2008/0165952 | A1 | 7/2008 | Smith et al. |
| 2009/0198620 | A1* | 8/2009 | Do ........................ G06Q 20/322 |
| | | | 705/26.1 |
| 2009/0300758 | A1 | 12/2009 | Hauck et al. |
| 2009/0313171 | A1* | 12/2009 | Yacobi .................... H04L 9/321 |
| | | | 713/176 |
| 2012/0089521 | A1 | 4/2012 | Abrevaya et al. |
| 2012/0143768 | A1 | 6/2012 | Hammad et al. |
| 2012/0150742 | A1 | 6/2012 | Poon et al. |
| 2012/0239475 | A1 | 9/2012 | Burgess et al. |
| 2012/0330786 | A1* | 12/2012 | Paleja ....................... G06F 8/53 |
| | | | 709/217 |
| 2013/0036058 | A1* | 2/2013 | Kelly ................. G06Q 20/3823 |
| | | | 705/67 |
| 2013/0073672 | A1 | 3/2013 | Ayed |
| 2013/0132235 | A1* | 5/2013 | Gandhi .............. G06Q 30/0601 |
| | | | 705/26.41 |
| 2013/0151857 | A1* | 6/2013 | Agrawal ............... H04L 9/3228 |
| | | | 713/178 |
| 2014/0025521 | A1* | 1/2014 | Alsina ................ G06Q 30/0601 |
| | | | 705/26.1 |
| 2018/0189047 | A1* | 7/2018 | Jaladi ....................... G06F 8/658 |

OTHER PUBLICATIONS

Erica Sadum, "DevJuice: Beeblex offers in-app purchase validation services", Jul. 18, 2012, download date: Jul. 30, 2012, http://www.tuaw.com/2012/07/18/devjuice-beeblex-offers-iap-validation-services/, pp. 1-4, Source: https://www.beeblex.com/public/.

"Apple Now Including Unique Identifiers for In App Purchase Receipts to Combat Hack", Jul. 18, 2012, download date: Jul. 30, 2012, MacRumors.com, http://forums.macrumors.com/showthread.php?t=1406490, pp. 1-6.

International Search Report and Written Opinion of the International Searching Authority for corresponding International Application No. PCT/US2013/048329, dated Mar. 28, 2014, 14 pages.

International Preliminary Report on Patentability for PCT/US2013/048329 dated Jan. 29, 2015.

"Identifying App Installations", Android Developers Blog, Mar. 30, 2011, 4 pages, 2011.

Office Action for Taiwan Patent Application No. 102125819, dated Mar. 10, 2015, 9 pages. (Best Available Copy).

Eric Slivka, "Apple Now Including Unique Identifiers for In App Purchase Receipts to Combat Hack", www.macrumors.com, dated Jul. 18, 2012, downloaded Jul. 30, 2019, https://www.macrumors.com/2012/07/18/apple-now-including-unique-identifiers-for-in-app-purchase-receipts-to-combat-hack/, 11 pages, 2012.

* cited by examiner

Application Receipt 1000

Payload 1010

Attribute 1020
- Type 1021
- Version 1022
- Value 1023

Attribute 1030A
- Type 1031A
- Version 1032A
- In-App Purchase Receipt 1040A
  - Attribute 1041A
  - ⋮
  - Attribute 1049A

⋮

Attribute 1030N
- Type 1031N
- Version 1032N
- In-App Purchase Receipt 1040N
  - Attribute 1041N
  - ⋮
  - Attribute 1049N

Certificate Chain 1050
- Golden Key 1051
- Vendor Certificate 1052
- App Store Certificate 1053

App Store Signature 1060

*Fig. 10* ial application. Ser. No. 13/668,109, filed Nov. 2, 2012, which claims the benefit of U.S. Provisional Application No. 61/673,413, filed Jul. 19, 2012, and hereby incorporates herein this provisional application.

BACKGROUND OF THE DISCLOSURE

In-App Purchasing allows an application to embed a store for purchasing application specific assets directly within an application. For example, an application such as a game application from a software developer can be purchased from an App Store (such as The iTunes App Store provided by Apple Inc. of Cupertino Calif.) and then a user of that application, after the application is installed on a device, can purchase something for use with the application directly from within the application (without having to go back to The App Store). An In-App Purchase generally uses various frameworks to connect an In-App store with an online store to process secure payments. The framework can prompt the user of the App to authorize payment for the asset, and then can notify the application housing the In-App store so the application can provide the item the user has purchased. The in-application payment functionality can be used to collect payment for assets that provide enhanced functionality within the application, or additional content usable by the application.

For example, an In-App Purchase can be used to implement scenarios such as an initially free application with additional premium features available to purchase inside the application, a book reader application that allows the user to purchase and download new books, or a game that offers new environments (levels) to explore. Additionally, online games can provide an In-App store that allows the player to purchase virtual property.

However, an In-App store presents several security issues that must be overcome to ensure user data is kept safe and to prevent malicious exploits that pose risks to users, application developers and service providers. Even if secure protocols are used between In-App store servers, and devices utilizing the In-App store, vulnerabilities may still exist if certain elements of the security system are disabled or rendered insecure due to unintentional or intentional action by the user, or some device or system malfunction. In some scenarios it is possible that users can be coerced into intentionally compromising system security in a manner that renders an otherwise trusted network system insecure.

SUMMARY OF THE DESCRIPTION

The embodiments described relate to techniques, methods, and systems for providing a layered or redundant security system for enabling In-App Purchases that uses multi-spectrum security methods to harden transactions against compromise by third parties. For example, in one embodiment, a unique (or quasi unique) device identifier can be received by an application store, or other on-line store, and the store can create a signed receipt that includes data desired from the unique device identifier. This signed receipt can then be transmitted to a device that is running the application obtained from the on-line store and the device can verify the receipt by deriving the unique (or quasi-unique) device identifier from the signed receipt and comparing the derived device identifier with the device identifier stored on the device.

In one embodiment, a unique (or quasi unique) vendor identifier can be assigned to vendors of applications containing an in-app store. When a device that is running an application containing an in-app store requests an on-line store transaction, the device can transmit the vendor identifier to the on-line store. The store can create a signed receipt that includes data desired from the vendor identifier. The signed receipt can then be transmitted to a device that is running an application obtained from the on-line store and the application or operating system can verify the receipt by deriving the unique (or quasi-unique) device identifier from the signed receipt and comparing the derived vendor identifier with the vendor identifier of the application vendor.

The various embodiments herein described can be implemented in numerous ways, including as a method, system, device, and computer readable medium. The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements, and in which:

FIG. 10 is block diagram of one embodiment of an Application Receipt with one or more In-App Purchase Receipts.

DETAILED DESCRIPTION

Various embodiments and aspects of in-app purchase security will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
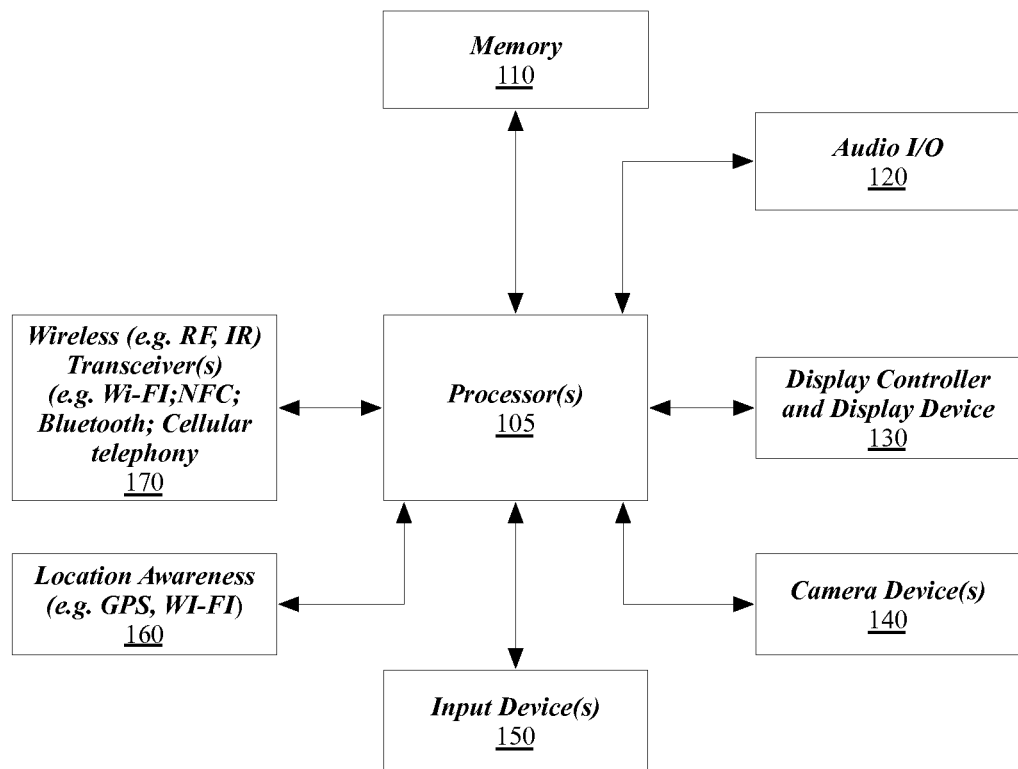
FIG. 1 is a block diagram of one embodiment of a mobile data processing system suitable for use with the described embodiments.

FIG. 1 is a block diagram of one embodiment of a mobile data processing system on which applications implementing In-App Purchases may execute. The data processing system 100 includes a processing system 105 with one or more microprocessors. The system 100 also includes memory 110 for storing data and programs for execution by the processing system. The system 100 additionally includes an audio input/output subsystem 120 which may include a microphone and a speaker for playing back music or providing telephone functionality through the speaker and microphone.

A display controller and display device 130 can be used to provide a graphical user interface for the user, such as the graphics user interface provided by iOS devices such as the iPhone, iPad and iPod touch. Additionally, the display and audio functionality can be coupled to provide video playback or video communication services. A wireless transceiver 170 can transmit and receive data via one or more wireless technologies such as Near Field Communication (NFC), Wi-Fi, infrared, Bluetooth, or one or more variants of wireless cellular technology. One embodiment of system 100 contains one or more camera devices 140 configured in both a front and rear facing configuration, though similarly configured systems each with a front facing camera, or no camera, can be one of many optimal configurations. The data processing system 100 can also include one or more input devices 150 that allow a user to provide input to the system. Input devices can include a keypad or keyboard, alone or in conjunction with a voice recognition system, or a touch or multi touch panel that is overlaid on the display device 130. Additionally, embodiments of the data processing system 100 can also include a device for providing location awareness services, such as a Global Positioning System (GPS) device 160 or its equivalent.

It is to be noted that the data processing system 100 as represented in FIG. 1 is by way of example. One or more buses or interfaces, which are not shown, can be used to interconnect the various components, as is well known in the art. As well, additional components, not shown, may also be part of the system 100 in certain embodiments, and in certain embodiments, fewer components than shown in FIG. 1 may also be used.

Figure 2:
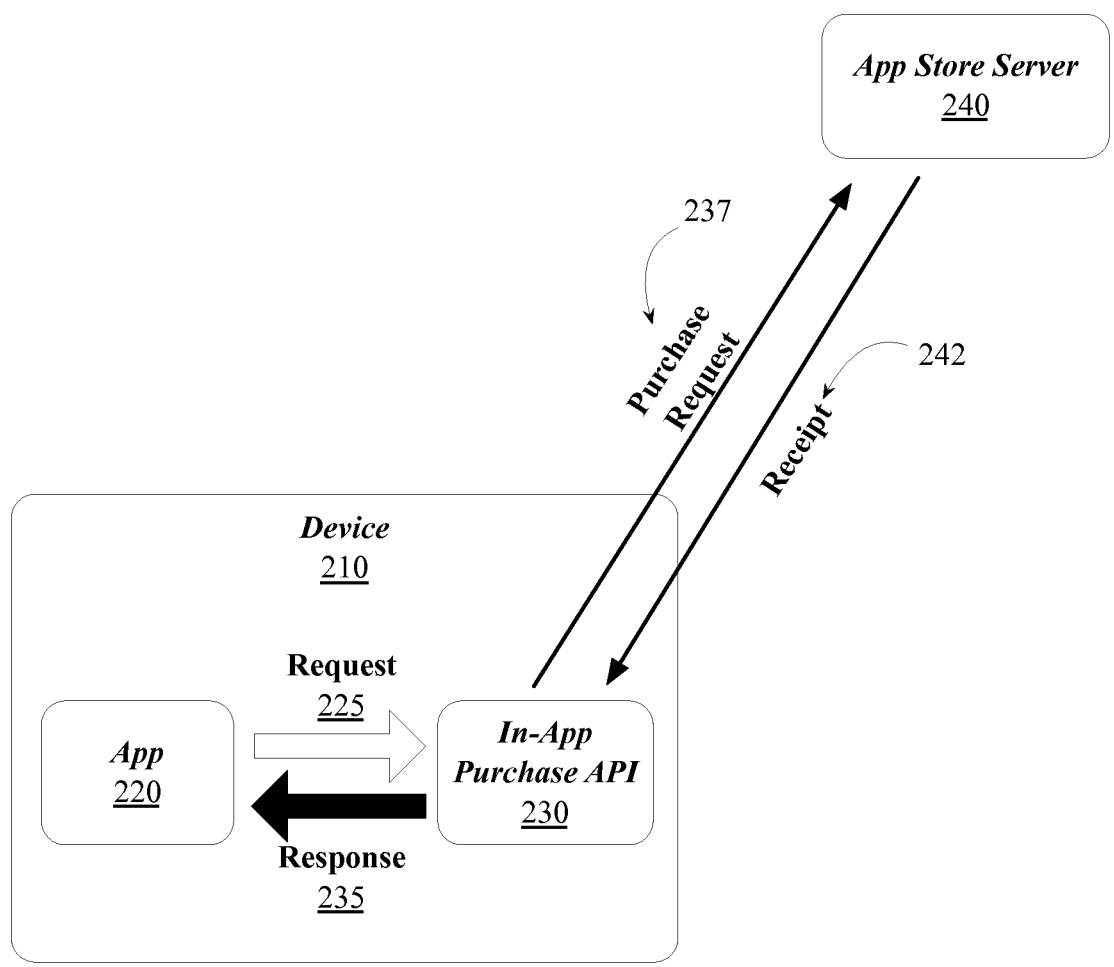
FIG. 2 is a block diagram of one embodiment of an In-App purchase model that allows applications to offer assets for purchase.

FIG. 2 is a block diagram of one embodiment of an In-App Store model that allows applications to offer assets for purchase. In the In-App Purchase Model 200, an In-App Purchase allows an application developer to embed a store directly within an application (e.g. App 220) running on an electronic device (e.g. Device 210). In one embodiment, a Device 210 executing an App 220 featuring an In-App Purchase Model 200 uses an in-app purchase API framework (e.g. a Store Kit framework 230) to connect to an App Store Server 240 on behalf of the App 220. In one embodiment, the App 220 can send a request 225 to the in-app purchase API framework 230 to conduct a transaction on behalf of the App 220. In one embodiment, multiple requests across multiple apps on the same device can be sent via the in-app purchase API framework 230 to an in-app purchase API 230 process, which can transmit those queries to the App Store Server 240. This request can be received from a user while the App 220 is being used by the user (for example, when the user is using the App 220 as the front most application) without running an application for an on-line store. The In-app purchase API framework 230 and the App Store Server 240 can then conduct a secure payment transaction to purchase application specific assets. In on embodiment, the In-app purchase API framework 230 interacts with the device operating system to prompt the user to authorize a payment, and a purchase request 237 is sent to the App Store Server 240. If the request is proper, a receipt 242 is sent from the App Store Server 240 to the device, and the In-app purchase API framework can send a response 235 to the App 220 so that the App 220 can provide one or more items the user has purchased. Using the In-App Purchase Model 200, an application developer can delegate financial transactions to the device operating system instead of having to implement a separate payment system for each application. The application developer can then offer to sell enhanced In-App functionality, such as items in a game, or books and magazines in an E-reader application. In one embodiment, the In-App Purchase Model 200 is limited to accepting payment in exchange for the purchase, and the application developer can provide the added in-app asset or functionality, such as unlocking built-in features or downloading content from third party servers. In one embodiment, it is the responsibility of the application developer to verify that the In-app purchase API framework 230 transaction with the App Store Server 240 successfully resulted in a valid transaction. In such embodiment, if the application developer does not do so, it is possible the Application will provide content as the result of a fraudulent or unsuccessful purchase.

Figure 3:
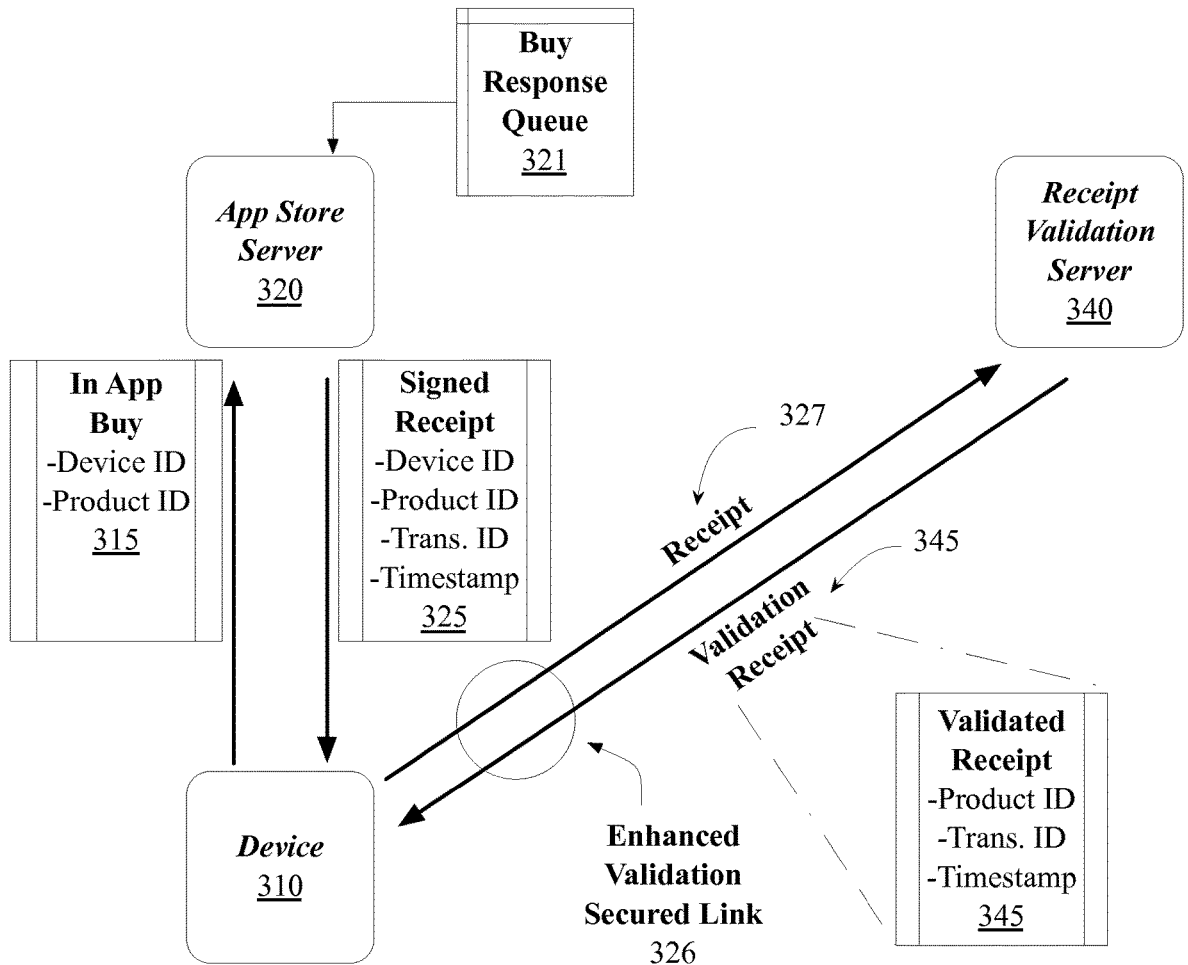
FIG. 3 is a block diagram of one embodiment of an In-App Purchase security model with multiple layers of validation and verification.

FIG. 3 is a block diagram of one embodiment of an In-App Purchase security model with multiple layers of validation and verification. Multiple layers of validation and verification can harden the In-App Purchase system to reduce the vulnerability of the system to malicious subversion of the components or servers used in the system. In one embodiment, the In-App Purchase Security System 300 includes a Device 310, which executes an App with an In-App Store, or an In-App Purchase Model as otherwise implemented. As described in FIG. 2, the App can use an In-app purchase API framework to communicate with an App Store Server 320 on behalf of the App. In one embodiment, the application uses the in-app purchase API framework to receive localized information from the App Store Server 320 about products available for purchase within the application. The application can then display this information and allows the purchase of items or assets for use within the application. When an item is purchased, the Device 310 can issue an In-App Buy 315 to the App Store Server 320 containing a Unique Device Identifier and a Product Identifier. In one embodiment, a unique (or quasi-unique) identifier is an alphanumeric number used to individually identify each Device 310. For example, the identifier can be stored in a secure Read Only Memory (ROM) of the device and can be a unique serial number of the device, which is used to create a secure and trusted execution environment. An example of how a quasi-unique identifier can be used to create a secure execution environment is provided in published U.S. application U.S. 2008/0165952, which is incorporated herein by reference. It is to be noted that while, in one embodiment, the unique identifier is a quasi-unique device identifier, for example purposes the identifier will be referred to, in general, as a unique device identifier. The Product Identifier identifies the item for which the app is requesting a purchase transaction. In one embodiment, a secure data session is established between the Device 310 and the App Store Server 320 using one or more implementations of encrypted communication methods, such as, but not limited to, Secure Sockets Layer (SSL) or Transport Layer Security (TLS). In one embodiment, the App Store 320 receives the In-App Buy 315 request and processes the financial transaction using account specific financial information accessible by the App Store Server 320. Once the App Store Server 320 conducts the financial transaction, a transaction receipt can be generated and cryptographically signed by the App Store Server 320. In one embodiment, the Signed Receipt 325 is placed in the App Store Buy Response Queue 321 for the Device requesting the In App Buy 315. In one embodiment, the App Store Server 320 commands sufficient resources to maintain a separate server-side buy response queue for each Device 310 (and there can be millions of such devices) with access to the App Store. The Device 310 can periodically check the server side Buy-Response Queue 321 and retrieve a Signed Receipt 325 for the transaction which contains, among other data elements, the unique identifier associated with the Device 310, the Vendor ID and Product ID associated with the purchased In-App asset, in addition to a Transaction ID associated with the transaction, and an optional date or time stamp which can record the server, device, or universal time associated with the In-App purchase.

To assist in maintaining the integrity of the In-App purchase system, the application developer can verify the signed receipt, the information associated with the signed receipt, as well as the receipt itself, using one or more of a plurality of available methods. In one embodiment, the App, having received a notification of the availability of a signed receipt, can retrieve the Signed Receipt 325 from the Buy Response Queue 321 and verify the validity of the signature of the signed receipt. If the signature is invalid, it is possible that the device has been tampered with in a manner that can send In App Buy 315 requests to one or more invalid servers masquerading as App Store 320 servers, or that a "man in the middle" style attack has tampered with the contents of the buy response. When an invalid signature is detected, the application can reject the receipt as invalid and take note of the failure by, for example, refusing to provide the virtual good, or triggering an error dialog. In one embodiment, an App can log repeated failures or report the failed transaction to the operating system on the Device 310. Beyond the receipt signature, the Device 310, or an application on the Device 310, can verify other aspects of the transaction to add additional layers of security. In one embodiment, the Signed Receipt contains the unique identifier of the device, and can be used to verify that the device that sent the In-App Buy request 315 to the App Store Server 320 is the same device that received the Signed Receipt 325. For example, a malicious user may attempt to capture the signed receipt from a first device and replay the retrieval of the signed receipt on a second device. In one embodiment, if a first device were to conduct an In-App purchase and receive a signed receipt 325 from the App Store Server 320, the signed receipt 325 will not be operable to simulate a purchase on a second device because the Device 310 or the App will recognize the unique device identifier discrepancy.

In one embodiment, the product ID data of the Signed Receipt 325 is verified to prevent the purchase of one item from an In-App store to enable the purchase of numerous other items from the In-App store via a capture and replay exploit. In one embodiment, each device keeps a record of past transactions and verifies each successive transaction against past transactions. While the search time may increase as the number of past transactions increases, embodiments using this method can prevent same device replay exploits. In one embodiment, the transaction identifier can contain a monotonously increasing transaction number, and an application can check that this number is strictly greater than that of the last transaction.

Optionally, a device may also check the time stamp of each Signed Receipt 325. In one embodiment, the Signed Receipt 325 can contain a time stamp, which tracks the time of the In-App Buy 315 transaction. An App running on the Device 310, or the operating system of the Device 310, can then reject receipts with a time stamp that fall too far outside of a range of the In-App Buy 315 transaction. In one embodiment, both a timestamp and an original purchase timestamp are stored. An original purchase timestamp can be used to track the original purchase date of an In-App Buy 315 that is now subsequently being restored in the event an authorized user is conducting an authorized restoration of In-App purchases. In such an event, the timestamp of the Signed Receipt 325 may not match a time stamp associated with the original In-App Buy 315, but the original purchase date will be appropriately contemporaneous with the original In-App Buy 315 data stored for the transaction or receipt.

In the embodiment described above, an application implementing an In-App purchase model can validate the Signed Receipt 325 by checking the data stored in various data structures of the Signed Receipt. In one embodiment of the In-App Purchase Security System 300, the data structures of the Signed Receipt 325 are opaque to applications on the Device 310. In one embodiment, the data stored in the Signed Receipt 325 is accessible for local verification on the device, but some or all data elements are subject to redundant verification to enhance security. In such embodiments of the In-App Purchase Security System 300, a secure Receipt Validation Server 340 is provided to assist application developers in validating signed receipts from the App Store Server 320. The Receipt Validation Server 340 can decode data encoded within various data structures within the Receipt 327. The Receipt 327 can be the Signed Receipt 325, or some subset of receipt data. To contact the Receipt Validation Server 340, the Device 310 first verifies that the Receipt Validation Server exists at the expected network location and that the device is communicating with the actual Receipt Validation Server. Such verification methods help to ensure that the system has not been tampered with to re-direct receipt verification to an invalid network address or to an invalid verification server, either of which potentially exposes user's of the device to theft or data lost.

In one embodiment, SSL or TLS can be used to secure the connection between the Device 310 and the Receipt Validation Server 340, as in the case of the connection between the Device 310 and the App Store Server 320. When using SSL, the Device 310 will attempt to connect to a server, such as the App Store Server 320 or Receipt Validation Server 340 by first requesting that the server identify itself by presenting its identification credentials. The server can then send the Device 310 a copy of a TLS certificate, or some other cryptographically signed credential. In one embodiment, the credential is signed by a Certificate Authority, which vouches for the identity of the certificate holder by signing the certificate with its certificate authority key. However, in one embodiment, a "self signed" certificate is accepted, which is an identity certificate which is signed by the same entity whose identify is being certified. Self-signed certificates do not demonstrate the level of trust provided by certificates signed by a Certificate Authority and, in some instances, may not be reliable. If the Device 310 trusts the certificate, it may notify the server that the Device 310 accepts the server credentials, and the server and device may establish an encrypted connection. However, it is possible that secure connections can become insecure due to inadvertent or intentional device tampering. Security compromises may result from attempts to compromise the system security with, in one example, a "spoofing attack" in which a person, program or server successfully masquerades as another person, program or server by falsifying data. An additional vulnerability known as "SSL stripping" is a type of "man-in-the-middle attack" that redirects users to supposedly secure websites that are in fact using falsified credentials.

In one embodiment, the Device may require all servers involved in the In-App Purchase system to use enhanced validation secured links, such as an Enhanced Validation Secured Link 326. The Enhanced Validation Secured Link 326 is one method by which the In-App Purchase Security System 300 can prevent the use of a compromised Device 310, or compromised App Store Server 320 or Receipt Validation Server 340. In one embodiment, the Enhanced Validation Secure Link 326 can be established via the use of an Extended Validation Certificate (EV Certificate). An EV Certificate is a signed certificate that indicates the Certificate Authority has done a higher level of identity verification than a standard CA signed certificate, and that the Certificate Authority has been subjected to an independent audit to verify, among other items, the authority's identity verification and signing processes, and the authority's signature key and certificate security measures. The enhanced identity verification and auditing that demonstrates a higher value of trust than standard signatures. Accordingly, EV Certificates to be used to establish an Enhanced Validation Secured Link 726 with a higher level of confidence than other secure links. In one embodiment, the Enhanced Validation Secured Link 726 can also disallow connections using self-signed keys. Once trusted and encrypted communication is established between the Device 310 and the Receipt Validation Server 340, Receipt data 327 can be sent for validation and the Receipt Validation server can return a Validation Receipt 345 indicating the success or failure of the receipt validation process.

Figure 4:
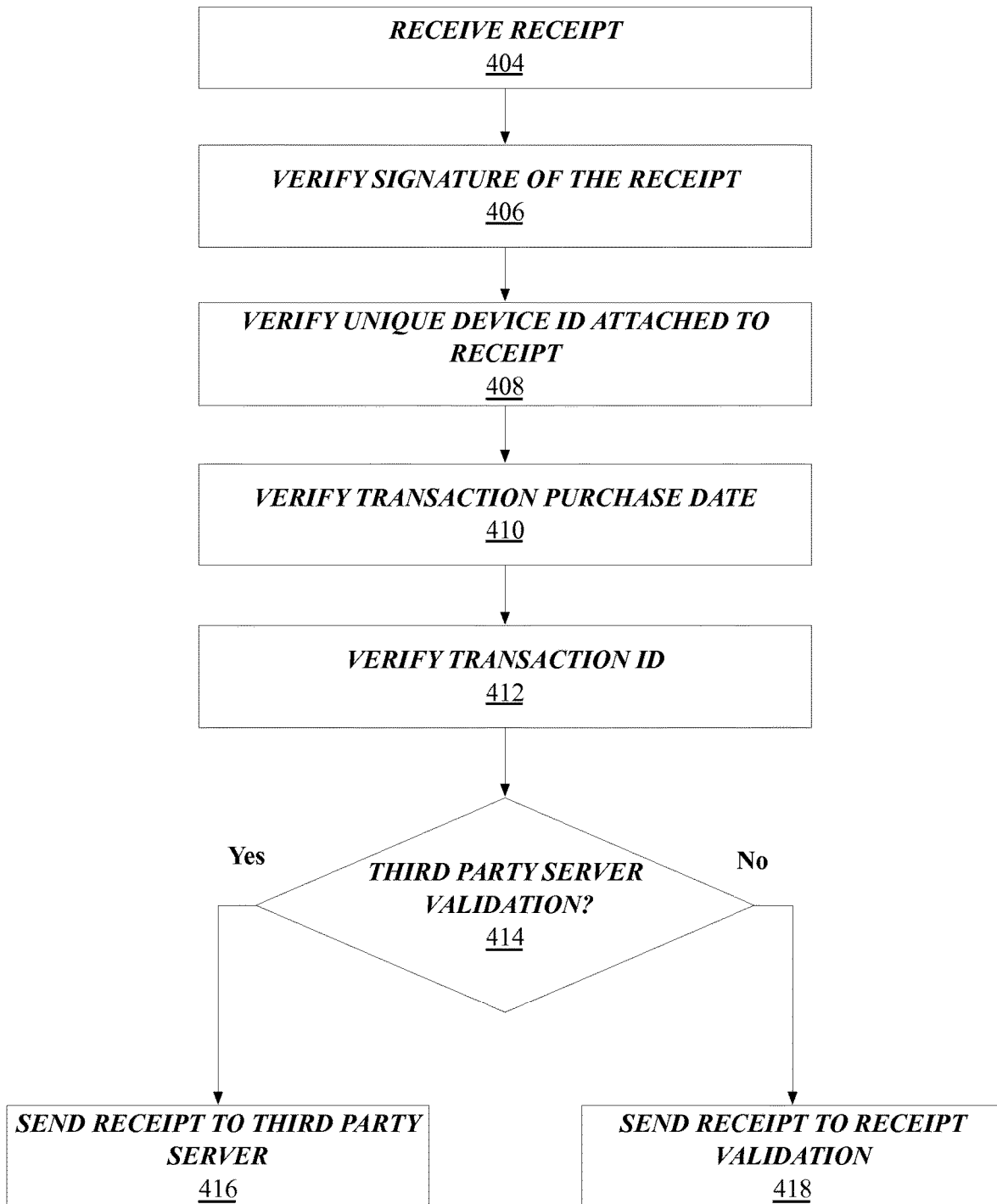
FIG. 4 is a flow diagram representing an embodiment of a client phase of signature and transaction verification.

FIG. 4 is a flow diagram representing an embodiment of a client phase of signature and transaction verification. In one embodiment, a device or App can conduct local receipt validation either before, or in lieu of, remote receipt validation using a method such as Signature and Transaction Verification 400. Such method can begin with a Receive Receipt operation 403 in which the device or app retrieves the signed receipt from the sever side buy response queue associated with the device. In the event a malfunction or malicious user triggers a false notification of a completed transaction, the absence of an actual receipt would indicate the operation was unsuccessful. In operation 406, the signature of the receipt is verified to ensure the legitimacy of the App Store that supplied the receipt. The signature of the receipt is a digital statement attesting to the identity of the entity providing the receipt. In this case, the App Store digitally signs the receipt using a private encryption key. The signature can then be verified using a public key associated with the App Store.

In one embodiment, an App or device can implement operation 408 which can verify the quasi-unique ID associated with the receipt. If the unique ID in the receipt differs from the unique ID of the device, then the receipt may be part of a cross-device replay exploit and is rejected. In one embodiment, an App or device can implement operation 410, which can verify the transaction purchase date, which can be embodied in one of several forms of timestamps associated with the time and date associated with the In-App purchase and the generation of the receipt. In one embodiment, a device or App can maintain a list of transaction identifiers for each transaction. In operation 412, the transaction identifier associated with each receipt can be verified against past transactions to ensure a past receipt is not attempting to masquerade as a new receipt. In the event a receipt is received with a transaction identifier that matches a previously completed transaction for the device or App, the receipt can be rejected as invalid.

In one embodiment, applications implementing an In-App Purchase Model can unlock certain content that is encompassed within the App, but unavailable until purchase. In one embodiment, a third party server will house content that will be delivered to the device for use within an App. In such case, a device or App will, in operation 414, determine if a third party server will be contacted to continue to In-App Purchase process. In the event no third party server is required, the Signature and Transaction Verification process 400 will conduct operation 418 which will send the receipt, or receipt data, to a receipt validation process, which may be a local process, or involve a receipt validation server, such as the receipt validation server 340 of FIG. 3. Alternatively, if a third party server is used to house content for the In-App Store, operation 416 can send the receipt to a third party server for an additional round of validation, or to act as a proof of purchase used to trigger content delivery. In one embodiment, the third party server that conducts additional validation and the third party server that houses content for delivery are the same server. In one embodiment, the use of a third party validation server is independent from the use of a third party content server. In one embodiment, a third party content server can be used without a third party validation server to conduct additional receipt validation.

Figure 5:
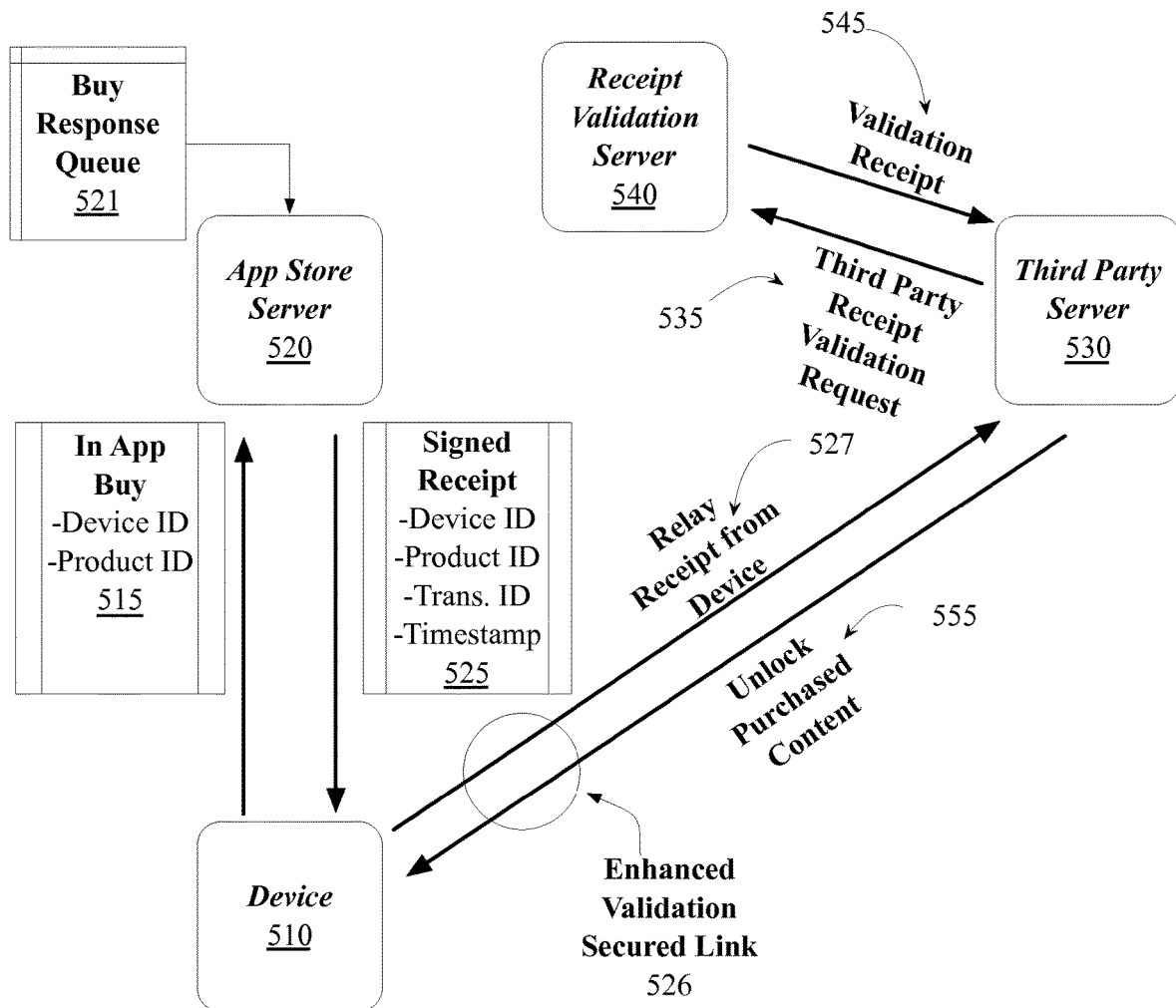
FIG. 5 is a block diagram of one embodiment of In-App Purchase security involving a third party server.

FIG. 5 is a block diagram of one embodiment of In-App Purchase security involving a third party server. In one embodiment, an In-App Purchase Security System 500 is adapted to operate with a third party server. As in FIG. 3, a Device 510 executes an App with an implementation of an In-App Purchase Model. An In-App buy request 515 is sent to an App Store Server 520 which processes a financial transaction associated with the purchase and loads a Signed Receipt 525 in the server-side Buy Response Queue 521 associated with the Device 510. The Signed Receipt 525 may be an opaque data structure requiring a the use of a Validation Server 540 programmed with the information used to decode and interpret the data stored in the receipt data structure, or may contain known information stored in a known format, allowing the Device 510 or an application on the Device 510 to conduct local validation.

In one embodiment, the Receipt 527 or receipt data is sent to a Third Party Server 530 which can house content. For example, a book or magazine reader application may provide books or magazines for purchase to users via an In-App Purchase Model. Once a financial transaction has been conducted on behalf of the application by the App Store via the App Store Server 520, the app can acquire the book or magazine from the Third Party Server 530. The Receipt 527 or some subset of the receipt can be relayed to the Third Party Server 530 as a proof of purchase for the transaction. In one embodiment, the Third Party Server can communicate with a Validation Server 540 to validate the Relay Receipt 527. In this scenario, communication links between the Third Party Server 530 and the Validation Server can be presumed to be secure, or the Third Party Server can default to un-trusted until an Enhanced Validation Secured link 526 is established using an EV trust mechanism as in the Enhanced Validation Secured Link 326 of FIG. 3.

In either scenario, the Third Party server can transmit a Third Party Receipt Validation Request 535 to the Validation Server 540 much in the manner of the Device 510 when transmitting the Relay Receipt 527 to the Third Party Server 530. The Receipt Validation Server 540 can, after examining the Receipt 535 from the Third Party Server, issue a Validation Receipt 545 that indicates to the Third Party Server 530 the success or failure of the Third Party Receipt Validation Request 535. The Third Party Server 530 can then transmit the Purchased Content 555 to the Device 510 for use within the App that issued the In App Buy 515 request. In one embodiment, the Third Party Server 530 can perform additional validation before transmitting the Purchased Content 555, or can accept the result of the Receipt Validation Server 540.

Figure 6:
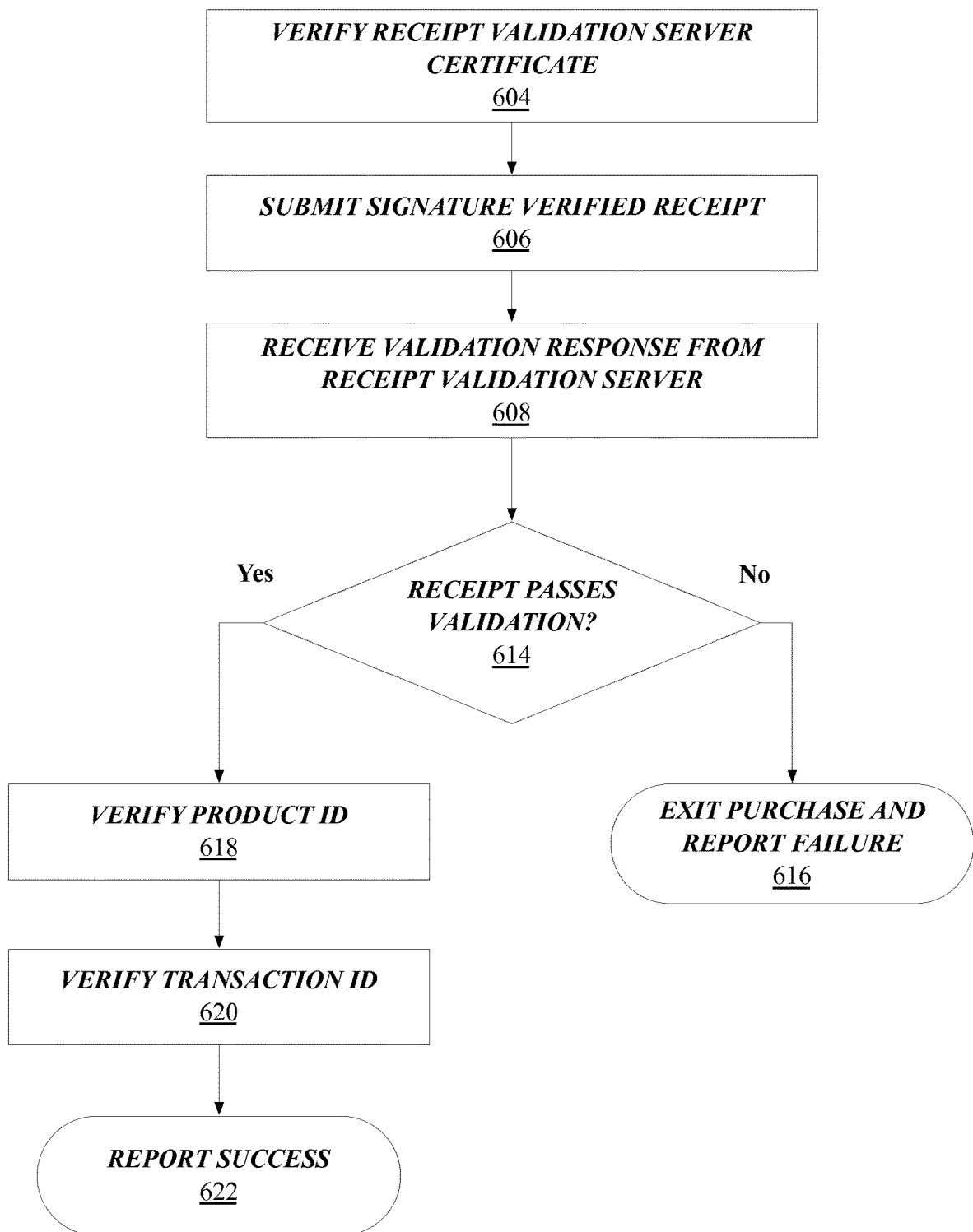
FIG. 6 is a flow diagram of one embodiment of verifying a receipt purchase validation.

FIG. 6 is a flow diagram of one embodiment of verifying a receipt purchase validation. Notwithstanding, the numerous security methods discussed above, the a server certification key or the In-App Purchase Security System may still become compromised due to inadvertent or unexpected actions, or by malicious actors using some method of intercepting or redirecting Receipt Validation Server traffic. Accordingly, an App or device may wish enable a method of verifying the results from a Receipt Validation Server. In one embodiment, an App or device can enable one embodiment of Receipt Validation Verification 600. In operation 604, an App or device can verify the Receipt Validation Server Certificate to ensure the Receipt Validation Server traffic has not been redirected to an insecure server. In one embodiment, operation 604 conducts an EV trust check to ensure both the network location and server name properly correspond to the location and identify specified in the EV certificate. Operation 606 can submit a signature verified receipt that has been pre-checked against the App Store certificate, as in operation 406 of FIG. 4. In operation 608, a validation response from the Receipt Validation server can indicate whether the Receipt is valid according to the algorithms in use on the Receipt Validation Server. In operation 614 the App or device can check if the submitted receipt passes validation, and if not, operation 616 can exit the purchase process and report a failure to the device operating system, the device user, or the third party vendor. In the event the receipt passes validation, additional checks may be in order to ensure the validity of the validation server.

In one embodiment, an operation 618 can verify the product ID associated with the receipt to prevent replay attacks that allow the purchase of a low value In-App item to enable the false purchase of a high value In-App item. An operation 620 can verify the transaction ID to prevent same-device replay attacks. Should the receipt information associated with the product ID and Transaction ID pass verification; the Receipt Validation Verification 600 process can report success in operation 622.

Figure 7:
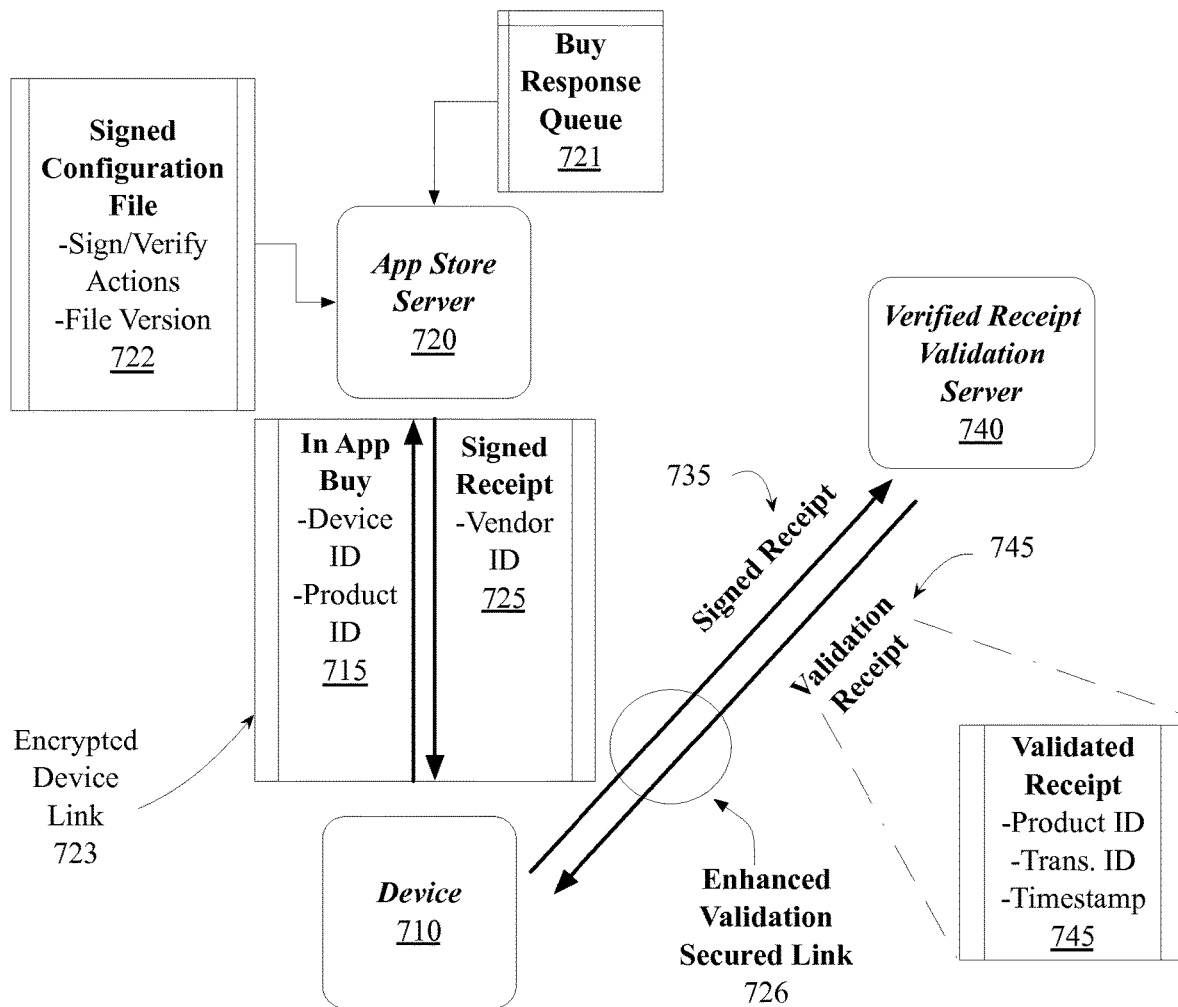
FIG. 7 is a block diagram of one embodiment of server enhanced In-App Purchase security.

FIG. 7 is a block diagram of one embodiment of server enhanced In-App Purchase security. In one embodiment, the operating system of Device 710 can implement a server enhanced In-App Purchase Security System 700 that conducts additional verification steps in concert with the App Store Server 720 and Verified Receipt Validation Server 740 either in lieu of or in conjunction with the methods described above. In one embodiment, the Device 710 establishes a hardened Encrypted Device Link 723 using an enhanced encryption algorithm and session security mechanism. In one embodiment, the Encrypted Device Link 723 security is enhanced by allowing the server and client append a signature to the message payload of each protected action, which can be verified by the recipient of the payload. The App Store Server 720 can then contain a Signed Configuration File 722 to configure server and client side actions when signing and verifying the payload. In one embodiment, the Device 710 can fetch the configuration file prior to establishing communication with the server. The Device 710 can then check to ensure that a minimum configuration version is in use on the App Store Server 720 before establishing a device link for the transaction. Checking the version number prevents the surreptitious substitution of a server running an older or invalid version of the App Store Server 720, or of a configuration file, which does not specify any transactions as protected.

Over the encrypted device link, the Device 710 can pass In App Buy 715 information-containing data such as a unique ID and purchase product ID. The App Store Server 720 can then sign the receipt and place the receipt in a Buy Response Queue 721. In one embodiment, applications will not have access to the unique device identifier of the Device 710 because the unique identifier information may allow application developers to derive information such as the serial number of the Device 710. The unique device identifier may be known by the operating system of the Device, allowing the use of the unique device identifier in establishing an Encrypted Device Link 723, or allowing a in-app purchase API framework component of the operating system include the unique identifier of the device in an In-App Buy 715 request. However, an App may not have the ability to request such information from the Device 710 or the operating system of the Device 710, which means that the App cannot use the unique device identifier to verify a Signed Receipt 725. In one embodiment, the App Store Server 720 can instead encode a Vendor ID associated with the App in the Signed Receipt 725, and the App running on the Device 710 can then check the Vendor ID of the Signed Receipt 725 as opposed to the unique device identifier in as in other embodiments. In one embodiment, for a given App on a given Device 710, the Vendor ID can be the same, while two Apps on the same Device 710 will be given different Vendor IDs. This functionality can allow an App to track each Device 710 that is using the App, without allowing an App developer to merge this information with user tracking information from a different application. Accordingly, moving from unique device identifier based verification to Vendor ID verification can prevent one method of cross-App user tracking.

In one embodiment, an Enhanced Validation Secured Link 726 is mandatory for all connections not utilizing a link such as the Encrypted Device Link between the Device 710 and the App Store Server 720. In one embodiment, a Verified Receipt Validation Server 740 is used whose identify is verified automatically when establishing the Enhanced Validation Secured Link, over which Receipt 735 data is passed. In one embodiment, the Receipt 735 data is signed with a digital signature to verify authenticity. In one embodiment, the operating system of the Device 710 works in concert with the Verified Receipt Validation Server to ensure the Validation Receipt 745 returned by the Verified Receipt Validation Server 740 is properly verified using data such as, but not limited to the Product ID, Transaction ID, and Timestamp of the transaction. In one embodiment, the application vendor verifies the receipt data and makes the ultimate determination whether to unlock purchased content to the user.

Figure 8:
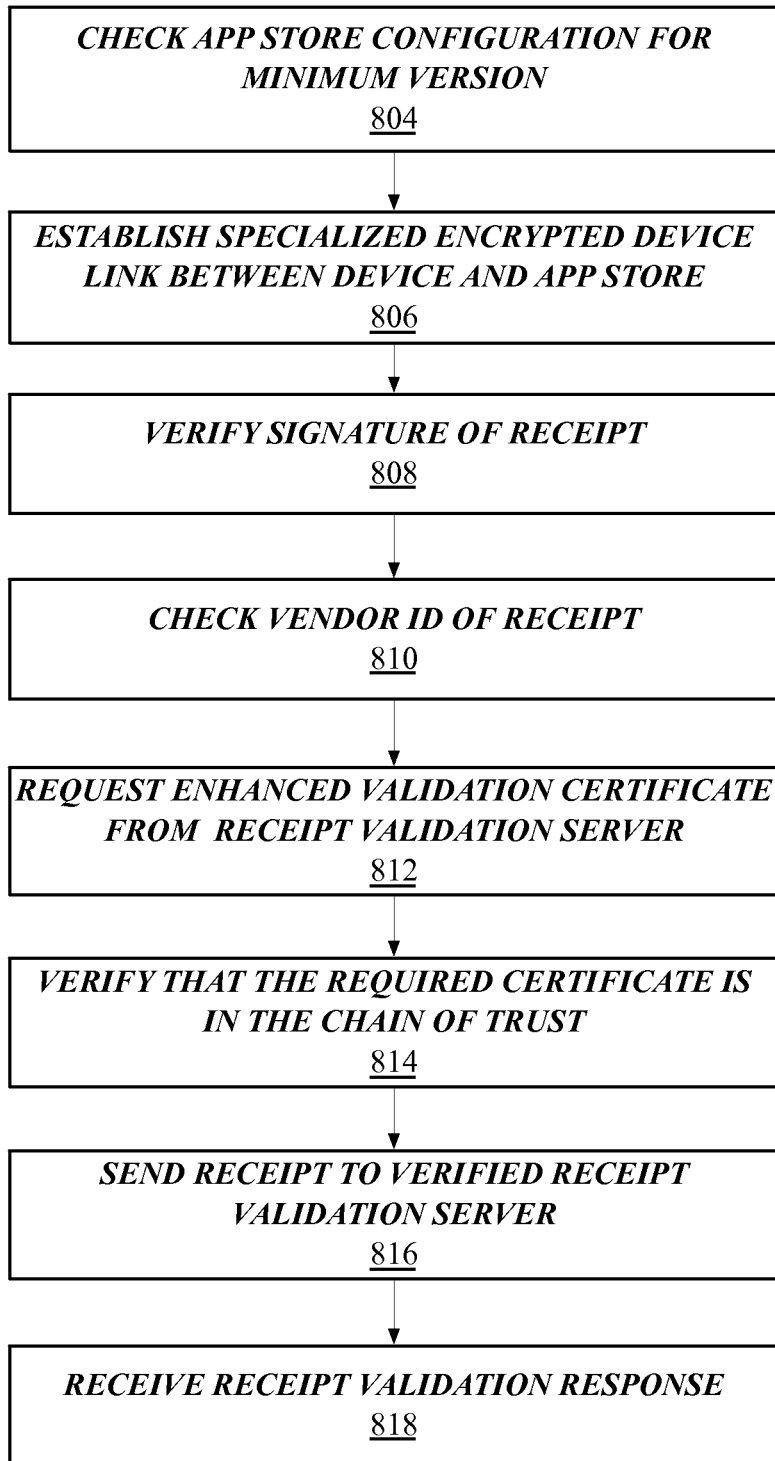
FIG. 8 is a flow diagram of one embodiment of secure server assisted verification.

FIG. 8 is a flow diagram of one embodiment of secure server assisted verification. In one embodiment, a Secure Server Assisted Verification Process 800 is implemented by the system illustrated in FIG. 7 to provide automatic verification of App Store and Receipt Validation Server identities. In one embodiment, operation 804 will block transactions between the Device and the App Store if the minimum server configuration file version is not in use. In Operation 806, a specialized encrypted device link between the Device and the App Store is established to allow a hardened and encrypted data path between a Device and the App Store. After the purchase data and receipts are exchanged, the Device Operating System will conduct operation 808 to verify the digital signature of the receipt and operation 810 to check the vendor ID of the receipt. In operation 812 an Enhanced Validation Certificate such as an SSL Extended Validation Certificate is requested from the Receipt Validation Server and verified before the Receipt Validation Server can be considered trusted and secure. In one embodiment, in the event an Enhanced Validation Certificate is present and valid, at some point within the certification-chain of signatures a golden key must be present before receipt data will be sent to the Receipt Validation Server. For example, in the event the Device is an iPhone or iPad device from Apple Inc. of Cupertino Calif., an Apple Inc. digital certificate will be in the certification key chain at some point, or the App Store server can be presumed to be insecure. In operation 814, the chain of digital certifications on the server will be searched for the required certificate or a secure connection cannot be established.

In one embodiment, if the receipt validation server is verified as secure, a receipt can be sent to the server in operation 816, and the receipt validation response received in operation 818 can be trusted as valid.

Figure 9:
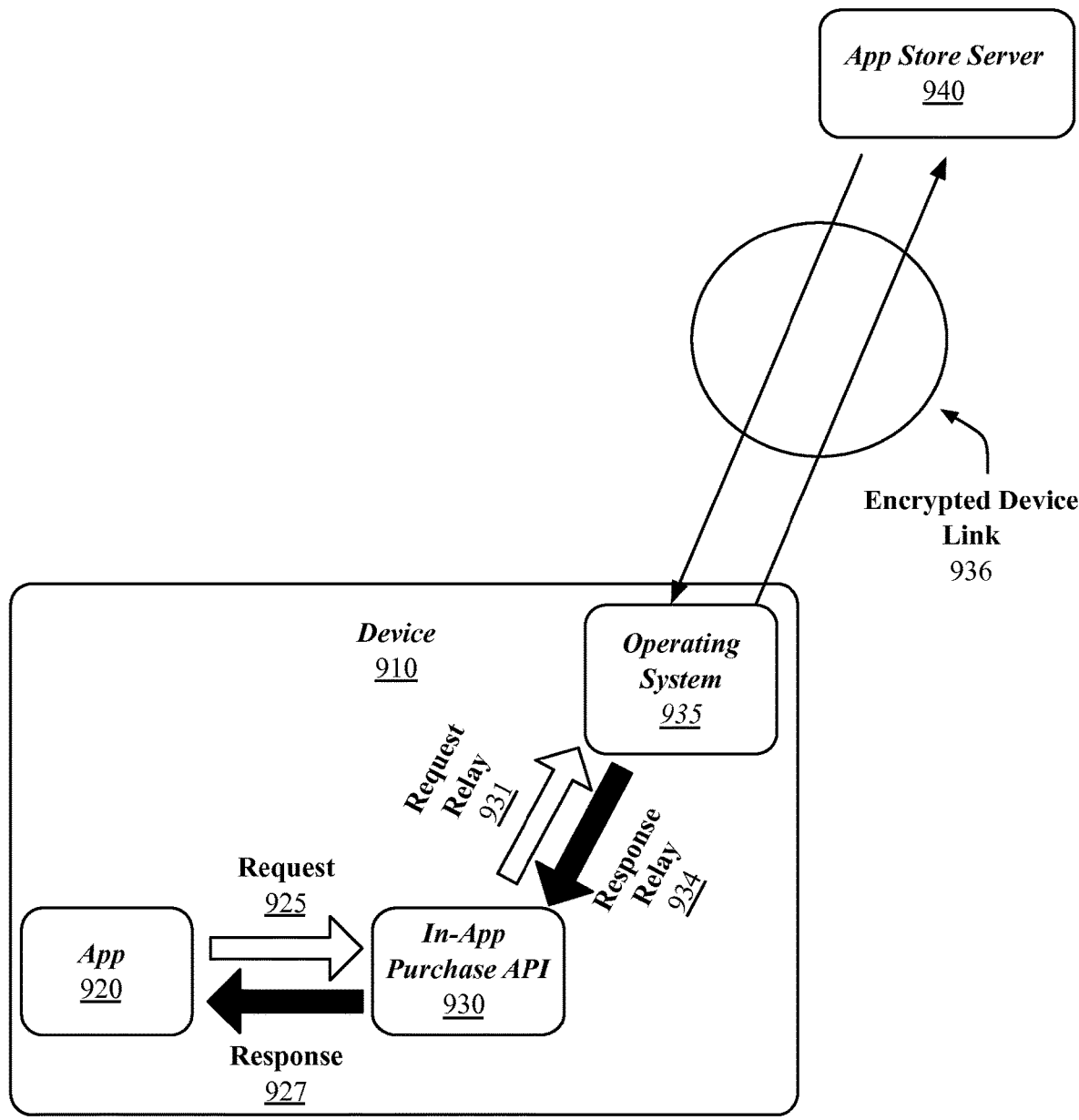
FIG. 9 is a block diagram of one embodiment of an In-App Purchase model with an Operating System managed receipt.

FIG. 9 shows a block diagram of one embodiment where the In-App Store Model utilizes an Operating System Managed Receipt. In one embodiment, a Device 910 executes an App 920, which is in communication with an in-app purchase API framework 930 to facilitate financial transactions. In one embodiment, the in-app purchase API framework 930 receives a Request 925 from an App 920 to perform a financial transaction for an In-App purchase. In one embodiment, the In-app purchase API framework 930 relays the Request 925 from the App 920 via a Request Relay 931 to the Operating System 935. The Operating system 935 can communicate with an App Store Server 940 via an Encrypted Device Link 936 to perform the financial transaction, and store the transaction receipt returned from the App Store Server 940 for validation. In one embodiment, the Operating System can perform a suite of validation techniques on the receipt returned from the App Store Server 940 to ensure the integrity of the receipt against, for example, interception, substitution, or modification. The Operating System 935 can then send a Response Relay 934 to the In-app purchase API framework 930, which can then send a Response 927 to the App 920.

In one embodiment, the App 920 receives the Response 927, which indicates whether or not the transaction has been successfully completed and whether or not the asset purchased through the In-App Purchase Model can be delivered. In one embodiment, in addition to a validated purchase, a receipt can be delivered to the App 920 so that the App 920 may perform additional validation techniques over and beyond those what are performed by the Operating System 935. Additionally the Operating System 935 can maintain the signed receipt as transmitted by the App-Store 940 and the In-app purchase API framework 930 or App 920 can re-request a known-good copy of the receipt to perform re-validation from time to time, or if there is any indication that a key has been compromised or a key-replay attack is in use. Alternatively, the Operating System 935 can request an update from the App Store Server 940 of one or more of the operating system managed receipts to perform periodic re-validation of stored receipts, or if there is any indication that a key has been compromised.

FIG. 10 shows a block diagram of one embodiment of an Application Receipt with one or more In-App Purchase Receipts. In addition to embodiments where application receipts are issued and maintained separately from In-App purchase receipts, the Application Receipt 1000 in FIG. 10 illustrates an embodiment of a receipt in which each In-App Purchase Receipt (e.g. In App Purchase Receipt 1040A) is stored in the same receipt data structure as the receipt for the original application (e.g. Application Receipt 1000). In one embodiment, each and every In-App Purchase Receipt generated by an In-App Purchase transaction may be stored within the Payload 1010 of the Application Receipt 1000 for the Application featuring the In-App purchase model, such that each separate In-App transaction, as well as the original Application purchase, may be readily verified by the Operating System or the Application.

For example, in one embodiment, an Application Receipt 1000 can be a cryptographically signed or encoded container that is managed by an Operating System, such as the Operating System 935 in FIG. 9. In one embodiment, the Application Receipt 1000 contains a data Payload 1010, and Payload Attribute 1020. The Payload Attribute 1020 can contain data structures defining an Attribute Type 1021, Version 1022, and Value 1023, which can contain several classes of data relevant to one aspect or another of the Application Receipt 1000. In one embodiment, an attribute, such as Attribute 1030A, can be carried in the Payload 1010 of the Application Receipt 1000. Attribute 1030A can contain several values, each indicating a different purpose for the attribute data. Additionally attributes data structures, such as Attribute 1030A can contain one or more data structures, such as Type 1031A and Version 1032A data structures which can contain information relevant to the In-App Purchase Receipt 1040A.

In addition to data for the Application Receipt 1000, in one embodiment, the Attribute 1030A can contain a value indicating that the attribute data structure contains In-App Purchase Receipt data, such as In-App Purchase Receipt 1040A. In one embodiment, the Payload 1010 can contain numerous attribute data structures, such that for each In-App purchase made, additional attributes, from Attribute 1030A through Attribute 1030N can be appended to the Payload 1010, and each attribute can contain type and version data, such as Type 1031N and Version 1032N data for In-App Purchase Receipt 1040N. Additionally, each subsequent In-App Purchase Receipt 1040N can contain several internal attributes, such as Attribute 1041N through 1049N. It is to be noted that there is no upper limit in In-App Purchase Receipt Attributes, or attributes containing In-App Purchase Receipts. Any such limits illustrated are used purely for example purposes, and not intended in a limiting manner. In one embodiment, each and every In-App Purchase Receipt generated by an In-App transaction can be stored within the Payload 1010 of the Application Receipt 1000 for the Application featuring the In-App purchase model such that each separate In-App transaction, as well as the Application purchase from the App Store, may be readily verified by the Operating System or the Application.

Figure 11:
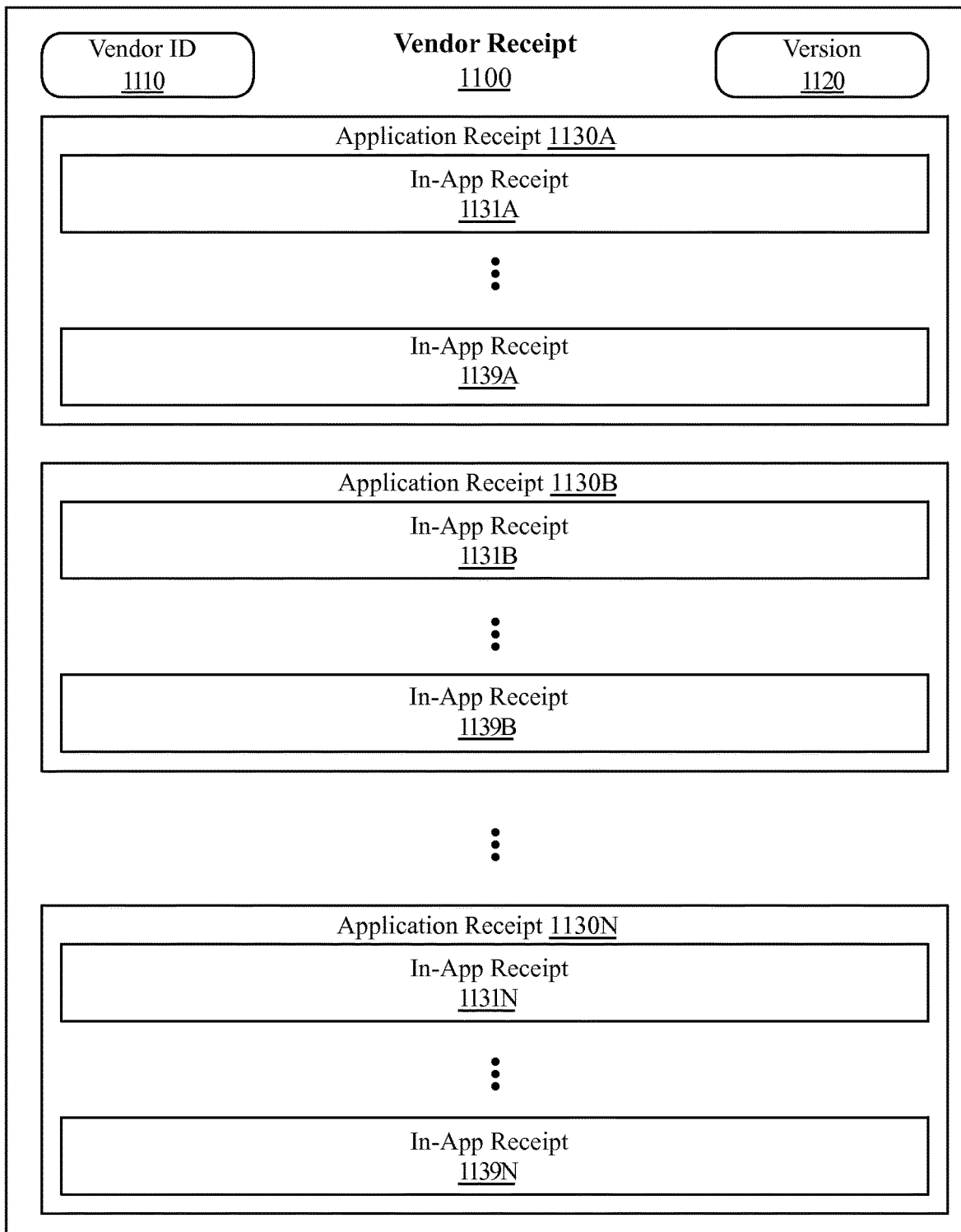
FIG. 11 is a block diagram with one embodiment of a Vendor Receipt with one or more Application Receipts, each containing one or more In-App Receipts.

In one embodiment, multiple applications from the same vendor can have linked or combined Operating System managed receipts for rapid receipt verification. FIG. 11 is a block diagram with one embodiment of a Vendor Receipt 1100 where one or more App Store application receipts can be stored in single Operating System managed Receipt, each application receipt containing one or more In-App Receipts. In on embodiment, a Vendor Receipt 1100 can contain data structures such as a Vendor ID 1110 data structure, or a Version 1120 data structure that indicates the vendor in question and the version of the Vendor Receipt 1100. In one embodiment, Version 1120 can indicate the revision number of the Vendor Receipt 1100 itself, or can indicate the version number of the Vendor Receipt 1100 data structure. Alternatively, the Version 1120 data structure may contain a hybrid version number that gives indication to both the version of the Vendor Receipt 1100 data structure and the revision of the individual vendor receipt. In one embodiment, the Vendor Receipt 1100 is an encrypted and encapsulated data structure. Alternatively, the Vendor Receipt 1100 may be a linked list of encoded or encrypted data structures all stored in Operating System memory.

In one embodiment, the Vendor Receipt 1100 can contain an Application Receipt 1130A which is the App-Store receipt for one of several applications from the vendor indicated by the Vendor ID 1110. For each Application Receipt 1130A, a receipt from the In-App store purchases can be stored, such as, for example, In-App Receipt 1131A. Each subsequent In-App receipt, through, as an example and not a limitation, In-App Receipt 1139A, can be stored within the Application Receipt 1130A.

In one embodiment, more than one application from the same vendor is purchased from an App-Store. In such case, a second Application Receipt 1130B can be stored in the Vendor Receipt 1100, and such Application Receipt 1130B can contain an In-App Receipt 1131B, through, for example 1139B, for each asset purchased from within the application.

In one embodiment, multiple application receipts, through example Application Receipt 1130N are stored or linked to the Vendor Receipt 1100. Each Application Receipt containing it associated In-App Receipt data 1131N through, for example, 1139N. As local resources allotted for receipt storage become constrained, in one embodiment, receipt data is stored in some manner of cloud storage service, such as an online distributed storage network. In one embodiment, the Vendor Receipt 1100, Application Receipts 1130A through 1130N, and each In-App Receipt, are all stored in cloud storage services, allowing Application, Operating System, and cloud level receipt verification.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense. The various aspects, embodiments, implementations, or features of the embodiment can be used separately or in any combination. Software, hardware, or a combination of both hardware and software can be used to implement the described embodiments.

The described embodiments can also be embodied as computer readable code on a non-transitory computer readable medium. A non-transitory computer readable medium is any data storage device that can store data which can thereafter be read by a computer system, other than medium designed specifically for propagating transitory signals. Examples of non-transitory computer readable media include floppy disks, flash memory devices, optical disks, CDROMs, and magneto-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions. In various embodiments, software-instructions stored on a machine-readable storage medium can be used in combination with hardwired circuitry to implement the present invention. Thus, the techniques are not limited to any specific combination of hardware circuitry and software, or to any particular source for the instructions executed by the data processing system associated an apparatus for performing one or more of the operations described herein.

The many features and advantages of the described embodiments are apparent from the written description and, thus, it is intended by the appended claims to cover all such features and advantages of the embodiment. Further, since numerous modifications and changes will readily occur to those skilled in the art, the described embodiments should not be limited to the exact construction and operation as illustrated and described. Hence, all suitable modifications and equivalents may be resorted to as falling within the scope of the embodiment.

What is claimed is:

1. A method of providing purchases through an application purchased from an online store, the method comprising:
   receiving, at a device, a request within the application to purchase an asset for use with the application which is produced by an application vendor;
   transmitting the request and a vendor identifier associated with the application vendor to the on-line store;
   receiving a signed receipt from the on-line store, the signed receipt including data derived from the vendor identifier, the signed receipt being signed by an operator of the on-line store;
   verifying, at the device, the signed receipt by comparing the vendor identifier obtained from the signed receipt to the vendor identifier of the application vendor.

2. The method as in claim 1, wherein verifying the signed receipt is conducted by a receipt verification server.

3. The method as in claim 2, wherein verifying the receipt data of the in-app purchase receipt is conducted via a third party server.

4. The method as in claim 1, further comprising verifying the signed receipt by comparing a product ID obtained from the signed receipt to the product ID of the requested asset.

5. The method as in claim 1, further comprising verifying the signed receipt by comparing a transaction ID obtained from the signed receipt to a transaction ID from a previous transaction.

6. The method as in claim 1, further comprising verifying the signed receipt's timestamp by checking that the signed receipt was signed contemporaneously with a transaction.

7. A non-transitory machine readable medium storing executable instructions which when executed by a data processing system cause the data processing system to perform a method of providing purchases through an application purchased from an online store, the method comprising:
- receiving, at a device, a request within the application to purchase an asset for use with the application which is produced by an application vendor;
- transmitting the request and a vendor identifier associated with the application vendor to the on-line store;
- receiving a signed receipt from the on-line store, the signed receipt including data derived from the vendor identifier, the signed receipt being signed by an operator of the on-line store;
- verifying, at the device, the signed receipt by comparing the vendor identifier obtained from the signed receipt to the vendor identifier of the application vendor.

8. The medium as in claim 7, wherein verifying the signed receipt is conducted by a receipt verification server.

9. The medium as in claim 7, wherein verifying the receipt data of the in-app purchase receipt is conducted via a third party server.

10. The medium as in claim 7, the method further comprising verifying the signed receipt by comparing a product ID obtained from the signed receipt to the product ID of the requested asset.

11. The medium as in claim 7, the method further comprising verifying the signed receipt by comparing a transaction ID obtained from the signed receipt to a transaction ID from a previous transaction.

12. The medium as in claim 7, the method further comprising verifying the signed receipt's timestamp by checking that the signed receipt was signed contemporaneously with a transaction.

\* \* \* \* \*